US 7,916,773 B2

(12) United States Patent
Wang et al.

(10) Patent No.: US 7,916,773 B2
(45) Date of Patent: Mar. 29, 2011

(54) SCALING AND TRUNCATING IN A RECEIVER FOR CODED DIGITAL DATA SYMBOLS

(75) Inventors: Xiaohui Wang, Lund (SE); Elias Jonsson, Malmö (SE); Andreas Cedergren, Bjärred (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 599 days.

(21) Appl. No.: 11/858,548

(22) Filed: Sep. 20, 2007

(65) Prior Publication Data

US 2008/0013603 A1  Jan. 17, 2008

Related U.S. Application Data

(63) Continuation-in-part of application No. 11/721,582, filed on Jul. 17, 2007.

(60) Provisional application No. 60/864,630, filed on Nov. 7, 2006.

(30) Foreign Application Priority Data

Dec. 20, 2004 (EP) .................................... 04388092

(51) Int. Cl.
H04B 1/00 (2006.01)
(52) U.S. Cl. ........................................................ 375/148
(58) Field of Classification Search .................... 375/148
See application file for complete search history.

(56) References Cited

U.S. PATENT DOCUMENTS

| 5,764,687 | A  | * | 6/1998  | Easton ........................... 375/147 |
| 6,233,273 | B1 | * | 5/2001  | Webster et al. ................. 375/148 |
| 6,363,102 | B1 | * | 3/2002  | Ling et al. ...................... 375/147 |
| 6,377,607 | B1 | * | 4/2002  | Ling et al. ...................... 375/130 |
| 6,748,201 | B2 | * | 6/2004  | Black et al. ................. 455/240.1 |
| 7,020,225 | B2 | * | 3/2006  | Sindhushayana et al. ..... 375/344 |
| 7,239,677 | B2 | * | 7/2007  | Jonsson et al. ................. 375/343 |
| 7,466,658 | B2 | * | 12/2008 | Cedergren et al. ............. 370/252 |
| 2002/0159551 | A1 | * | 10/2002 | Ekvetchavit et al. ......... 375/350 |
| 2003/0014453 | A1 | * | 1/2003  | Challa et al. ................... 708/277 |
| 2004/0076184 | A1 | * | 4/2004  | Tene et al. ...................... 370/476 |
| 2004/0184569 | A1 | * | 9/2004  | Challa et al. ................... 375/345 |
| 2004/0218698 | A1 | * | 11/2004 | Jonsson et al. ................. 375/343 |
| 2005/0286656 | A1 | * | 12/2005 | Muralidhar et al. .......... 375/340 |
| 2006/0072655 | A1 | * | 4/2006  | Lin ................................ 375/148 |
| 2006/0103587 | A1 | * | 5/2006  | Cedergren et al. ............. 345/1.2 |
| 2006/0274819 | A1 | * | 12/2006 | Bengtsson ...................... 375/147 |
| 2008/0008228 | A1 | * | 1/2008  | Cedergren et al. ............ 375/147 |

FOREIGN PATENT DOCUMENTS

| EP | 1 109 322 A2 | 6/2001 |
| EP | 1 443 668 A1 | 8/2004 |
| WO | WO 2004019576 A1 | * | 3/2004 |
| WO | WO 2004068734 A1 | * | 8/2004 |
| WO | WO 2006066648 A1 | * | 6/2006 |

* cited by examiner

OTHER PUBLICATIONS

Lee, "Normalization, windowing and quantization of soft-decision Viterbi decoder inputs in CDMA systems," Vehicular Technology Conference, 1999 IEEE 49th Houston, TX, USA, May 16-20, 1999, Piscatawa , N J, USA, vol. 1, 16 Ma 1999, pp. 221-225.*

*Primary Examiner* — Juan A Torres

(57) ABSTRACT

A method and a receiver for receiving coded digital data symbols sent from a transmitter through a transmission channel of a communications network is adapted to calculate first symbol estimates (y) of sent data symbols from the received data symbols, each of the first symbol estimates (y) having a first bitwidth (a+b), provide a scaling factor (s) and using the scaling factor (s) to scale the first symbol estimates, truncate the scaled symbol estimates ($y_{sc}$) to a second, lower bitwidth (c) and thereby providing second symbol estimates ($y_t$).

9 Claims, 7 Drawing Sheets

SCALING AND TRUNCATING IN A RECEIVER FOR CODED DIGITAL DATA SYMBOLS

CROSS-REFERENCE TO RELATED APPLICATIONS

This application is a continuation-in-part of U.S. application Ser. No. 11/721,582, filed Jul. 17, 2007, and also claims the benefit of U.S. Provisional Application No. 60/864,630, filed Nov. 7, 2006, the disclosure of which is incorporated herein by reference.

BACKGROUND

When coded digital data symbols are transmitted via a radio link, the transmitted signals typically propagate over multiple paths, so that the receiver receives multiple instances of the same signal at different times, i.e. with different delays. The data symbol energy from all these multipath components may be combined in the receiver. In Code Division Multiple Access (CDMA) and Wideband Code Division Multiple Access (WCDMA) systems the energy of the different received portions of the signal may be utilized in the receiver by using a so-called RAKE receiver.

In these systems spreading and despreading are used. Data is transmitted from the transmitter side using a spread spectrum modulation technique wherein the data is scattered across a wide range of frequencies. Each channel is assigned a spreading code to spread the data across the frequency range. For WCDMA systems such a channelization code is chosen from the so called Orthogonal Variable Spreading Factor code tree. The spread data is then randomized by a pseudo-random noise (PN) code, which is composed of e.g. a binary sequence of 1's and 0's, called "chips", which are distributed in a pseudo-random manner and have noise-like properties. The number of chips used to spread one data bit, i.e. chips/bit, may vary, and it depends, at least in part, on the data rate of the channel and the chip rate of the system.

In the receiver the received signal is despread and demodulated with the same spreading code using the same chip rate to recover the transmitted data. Furthermore, the timing of the demodulation must be synchronized, i.e. the despreading code must be applied to the received signal at the correct instant in time, which can be difficult due to the multipath effects mentioned above.

The performance of a CDMA receiver is improved by utilizing the signal energy carried by many multipath components. As mentioned, this is achieved by using a RAKE receiver, where each multipath component is assigned a despreader whose reference copy of the spreading code is delayed equally to the path delay of the corresponding multipath component. Thus, in each finger of the RAKE receiver the received chip sequence is despread (correlated) with the correspondingly delayed spreading code. The despread output symbols from each RAKE finger are then coherently combined to produce a symbol estimate.

Terminals for use with such communications networks are normally limited in size and computational resources. One result of this limitation is that there is only a limited bit width to represent data values in a terminal. Therefore, it will often be necessary to truncate or round data values before they can be handled in the terminal. In order to utilize the available bit width optimally, data values to be processed may be scaled by multiplying them with a scaling factor before they are truncated.

One example of data needing to be limited in bit width is found in the RAKE receiver of the terminal. At the outputs of the RAKE fingers the received signal for each channel (multipath component) is represented as a digital data value having one limited bit width in two's complement notation in both the real and the imaginary parts. Each received signal is then multiplied by the conjugate value of a channel estimate computed in the receiver to obtain an estimate of the sent coded data symbol. The products are then summed over the number of paths, and finally the bit stream is decoded. The conjugate value of a channel estimate also has a limited bit width in two's complement notation in both the real and the imaginary parts, which may be equal to or different from that of the received signal. When the two values are multiplied the resulting estimate will have a bit width that is equal to the sum of the two other bit widths. However, the bit width available for the processing of this estimate will also be limited and probably smaller than the sum of the two other bit widths.

Therefore, the bit width has to be reduced before the estimate is further processed, and a scaling factor may have to be selected in order to utilize the available bit width optimally. It is known to find a scaling factor by means of an optimisation algorithm that computes one fixed factor intended to be optimal in the current situation. However, since the signal level in the receiver typically changes very rapidly, a fixed factor will not be optimal, and it is generally not possible to find a scaling factor that is suitable in all situations. Adaptive algorithms that constantly update the scaling factor based on the input signals are also known.

One adaptive algorithm is disclosed in EP 1 672 807 A1, wherein a scaling factor is calculated from averaged amplitude values of estimated data symbols for a time slot and then used to select the output of the estimates for the next time slot. Although the scaling factor is changed every slot in EP 1 672 807 A1, which will affect the soft information for the entire Timing Transmission Interval (TTI) negatively, measures can be taken for good receiving and synchronisation conditions to minimise the fluctuations of the scaling factors.

If the synchronisations between the transmitter and the receiver are less than ideal due to e.g. frequency errors, or the estimated Signal-to-Interference Ratio (SIR) values are underestimated due to bad receiving conditions such as timing misalignment, too few or disturbed pilot symbols for SIR estimates etc, there is however a need for an improved algorithm which will avoid following the errors and thus degrade the performance.

SUMMARY

The present invention relates to a receiver and a method for receiving coded digital data symbols sent from a transmitter through a transmission channel in a communications network.

It is an object of embodiments of the invention to provide a method of the above-mentioned type, which provides a better scaling factor for most channel cases, and which can still be performed with the limited computational resources of a terminal of the type described above.

According to embodiments of the invention, a method of receiving coded digital data symbols sent from a transmitter through a transmission channel of a communications network is provided. In this method first symbol estimates of sent data symbols are calculated from these received data symbols. Each of the first symbol estimates have a first bitwidth a+b, i.e. each of the symbol estimates are represented by a+b bits. A scaling factor is then provided and is used to scale the first symbol estimates. These scaled symbol estimates are then truncated to a second, lower bitwidth c, i.e. so that each of the estimated symbols are represented by c bits, thereby providing second symbol estimates.

The scaling factor is according to embodiments of the invention provided in the following manner. A maximum amplitude value among a group of values associated with a group of received data symbols is found. Then this maximum amplitude value is compared to a filtered value. This filtered value is calculated based on at least a maximum amplitude value among a group of values associated with a group of previously received data symbols.

If the maximum amplitude value is lower than the filtered value, the scaling factor is calculated on basis of the maximum amplitude value, and otherwise the scaling factor which was provided for a group of first symbols estimates associated with a group of previously received data symbols is used as the scaling factor, i.e. the scaling factor remains unchanged.

The comparison with a filtered value is advantageous since, in ideal conditions, such as a stable channel, perfect synchronization and SIR estimates, the scaling factor should not be changed for each TTI (transmission time interval). Changing the scaling factor for each TTI could lead to that distorted data symbol estimates would be fed to the downstream decoders which would worsen their performance. If, on the other hand, e.g. the SIR is underestimated, a proper change of the scaling factor serves to compensate the underestimated part and thus recover the magnitude of the data symbols for a TTI.

BRIEF DESCRIPTION OF THE DRAWINGS

The invention will be described more fully below with reference to the drawings, in which.

DETAILED DESCRIPTION

To facilitate an understanding of exemplifying embodiments of the invention, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Figure 1:
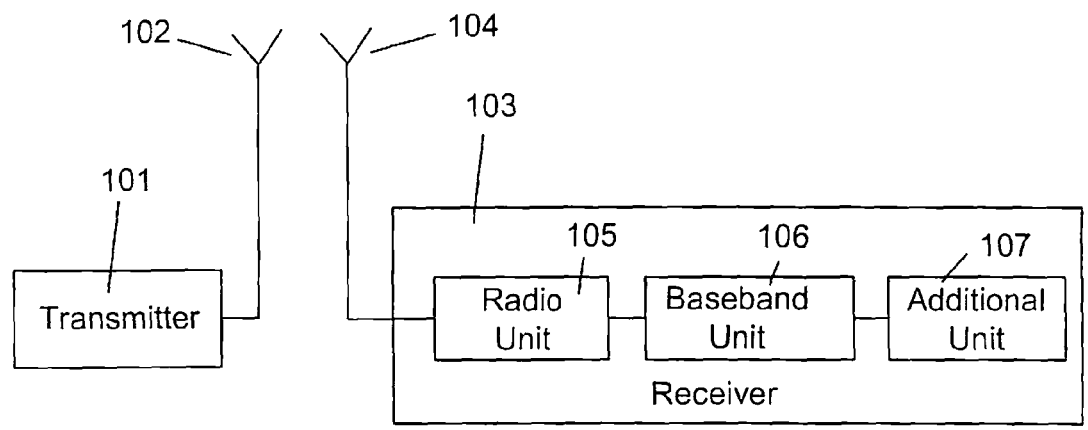
FIG. 1 shows a transmitter and receiver arrangement.

In FIG. 1 a transmitter 101 is shown, which, via a transmitter antenna 102, transmits a signal. A receiver 103 receives the signal via a receiver antenna 104. In the receiver 103, the signal is first processed by a radio processor or unit 105, then by a baseband processor or unit 106 and then by some additional processor or unit 107.

Figure 2:
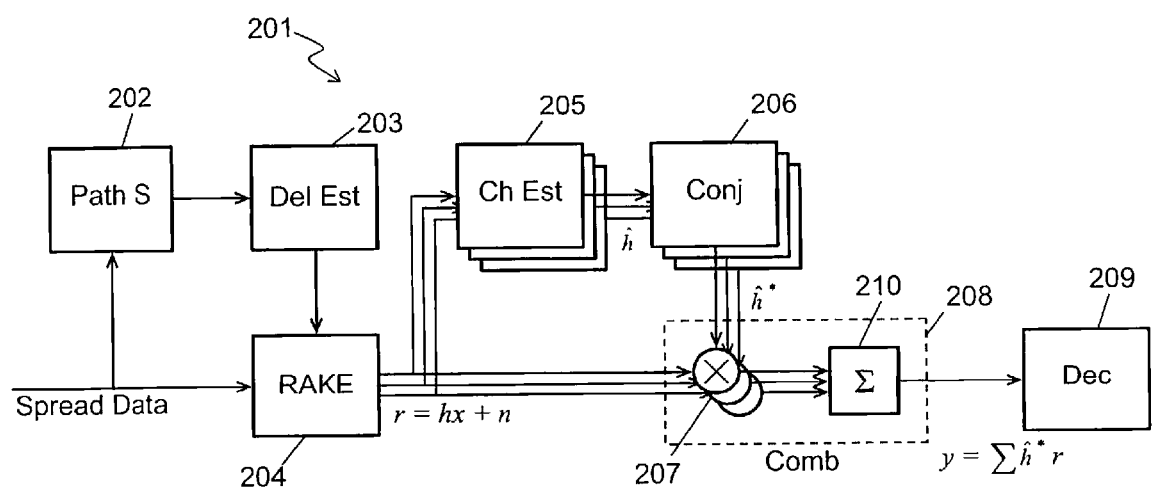
FIG. 2 shows a part of a receiver circuit wherein the invention may be employed.

FIG. 2 shows an example of a part of a receiver circuit 201 which is part of the baseband unit 106 and in which the invention can be used. The baseband unit, and the receiver circuit 201 in its turn, is a part of a terminal, e.g. a mobile telephone, for use in e.g. a Code Division Multiple Access (CDMA) system or a Wideband Code Division Multiple Access (WCDMA) system according to the 3GPP UMTS standard ($3^{rd}$ Generation Partnership Project—Universal Mobile Telecommunications System).

The receiver circuit 201 may use a RAKE receiver 204, which is capable of identifying and tracking the various multipath signals for a given channel. In this way the energy or power of several multipath components can be utilized in the receiver. In the RAKE receiver, each multipath component is assigned a despreader whose reference copy of the spreading code is delayed equally to the path delay of the corresponding multipath component. The outputs of the despreaders, i.e. the fingers of the RAKE receiver, are then coherently combined to produce a symbol estimate.

Although reference is here made to a receiver circuit in a mobile station, it should be noted that the algorithms described below may be used at any CDMA receiver, i.e. in a mobile station or a base station, and the transmission may be uplink or downlink.

Thus, a radio signal representing coded data symbols sent from a corresponding transmitter is received through an antenna and down-converted to a baseband signal in a front-end radio interface. Then the analog down-converted signal is level adjusted by an automatic gain control (AGC) unit, before being quantized by an analog to digital (A/D) converter and provided as spread data to the RAKE unit 204, but since these functions are not relevant to the present invention, they are not described in further detail here and not shown in FIG. 2. It is noted that the signal is complex and thus consists of an inphase (I) part and a quadrature (Q) part.

As shown in the receiver overview illustrated in FIG. 2, the spread data is supplied to the RAKE unit 204 and a path searcher 202. The path searcher 202 is used for detecting new paths and changed delays of existing paths, and it computes repetitively instantaneous impulse response estimates over a range of delays allowed by the system. Since the path searcher 202 is mainly used only to detect the existence of paths, its output resolution may be lower than that required by the RAKE unit 204. Thus a general delay estimation algorithm is used in the delay estimator 203, which is able to extract the path positions and find their delays with sufficient accuracy, once they are discovered by the path searcher 202, so that the best ones are selected for despreading in the RAKE unit 204.

The received signal is then despread in the RAKE unit 204, in which each reported delay estimate (path) is assigned a RAKE finger, and the received quantized signal is despread for each path by multiplying the quantized signal, sampled at chip rate, with its corresponding channelization code and scrambling code and sum over the length of the channelization code. Each RAKE finger thus presents a complex despread data symbol.

The output signal from each finger of the RAKE unit 204 is a signal r, which can be described as r=hx+n, where h represents the transmission channel, x is the sent coded data symbol, and n represents noise. Since there is a signal r for each finger, together they can also be considered as a vector $\bar{r}=\bar{h}x+\bar{n}$. All parameters are complex values. The signal r is represented as a digital value in the circuit by a number of bits, e.g. a bits, in two's complement notation in the real as well as the imaginary part.

For each channel, i.e. finger of the RAKE unit 204, a channel estimator 205 computes a channel estimate ĥ from the received signal r. This estimate is also represented as a digital value in the circuit by a number of bits, e.g. b bits, in two's complement notation in the real as well as the imaginary part. The conjugate function 206 calculates for each finger the complex conjugate of the channel estimate ĥ. In the combiner 208 an estimate y of the sent coded data symbol x is then achieved by multiplying for each finger the received signal r by the conjugate of the channel estimate for that finger ĥ in the multiplying units 207 and summing over all fingers in the summing unit 210, i.e. y=Σĥ*r. Estimate y is then output from the combiner 208 and passed on to the decoder 209 for further processing.

The estimate y would now be represented as a digital value by a+b bits in two's complement notation in the real as well as the imaginary part, but typically the computational resources are not sufficient to handle values with so many bits, and therefore some of the bits have to be truncated so that the estimate y is represented by e.g. c bits, where c<a+b.

Figure 3A:
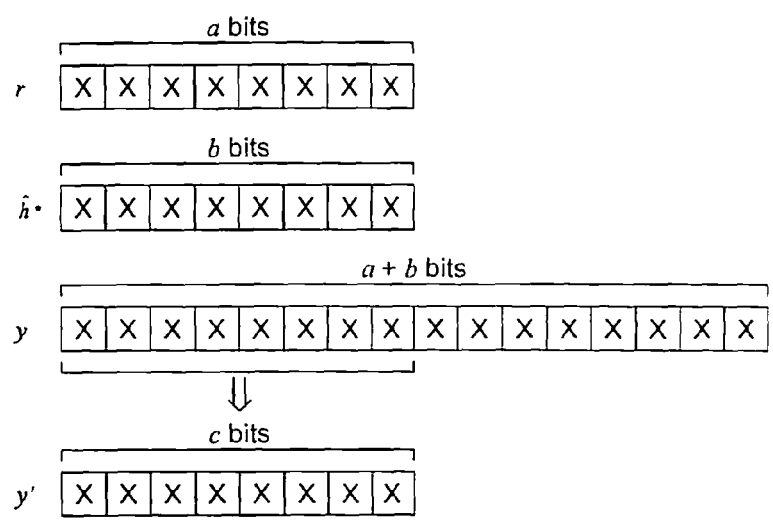
FIGS. 3a-3e illustrate a number of situations wherein an estimate having 16 bits is truncated so that eight bits remain.

FIG. 3a illustrates an example, where the received signal r and the conjugate ĥ* of the channel estimate ĥ for one channel are both represented by eight bits, i.e. a=b=8. The estimate y will then be represented by 16 bits. If, however, only eight bits are available for the representation of the estimate, the 16-bit estimate y has to be replaced by an 8-bit estimate y', and therefore the other eight bits will have to be truncated. Since all 16 bits may be carrying information, it will be obvious to keep the eight most significant bits and truncate the eight least significant bits, as it is shown in FIG. 3a.

Figure 3B:
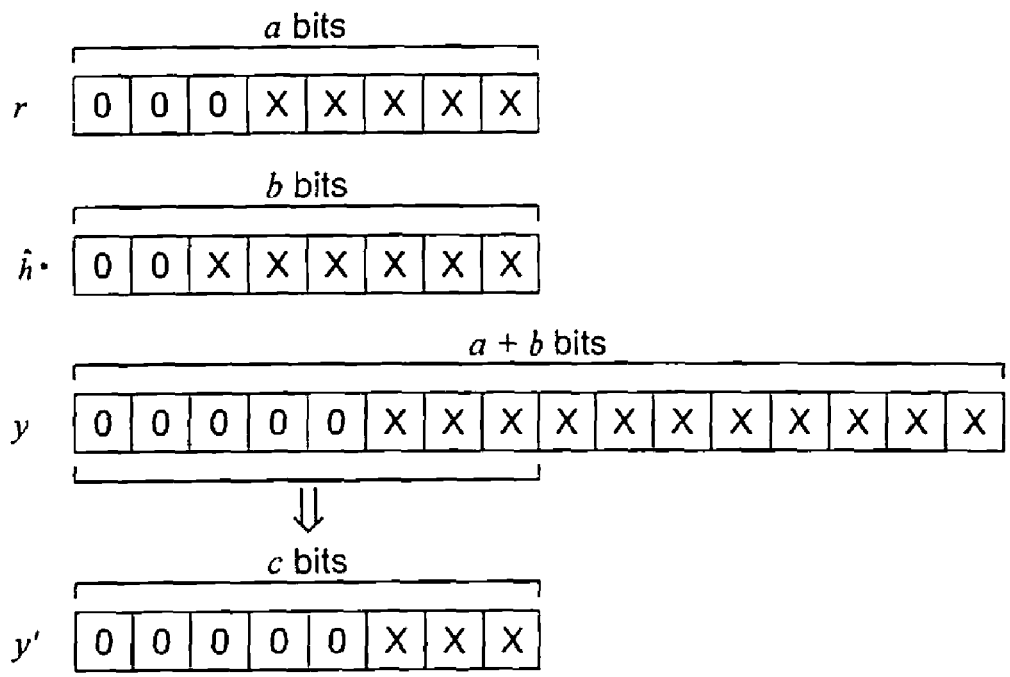

However, at low signal levels the most significant bits of the received signal r may have the value "0", and the same may be the case for the conjugate ĥ*. In FIG. 3b an example is shown, in which the three first bits of r and the two first bits of ĥ* have the value "0". As a result, the five first bits of the estimate y will also have the value "0". If y' is still taken as the eight most significant bits of y, as shown in FIG. 3b, much information will be lost, since only three information carrying bits are left in y'.

Figure 3C:
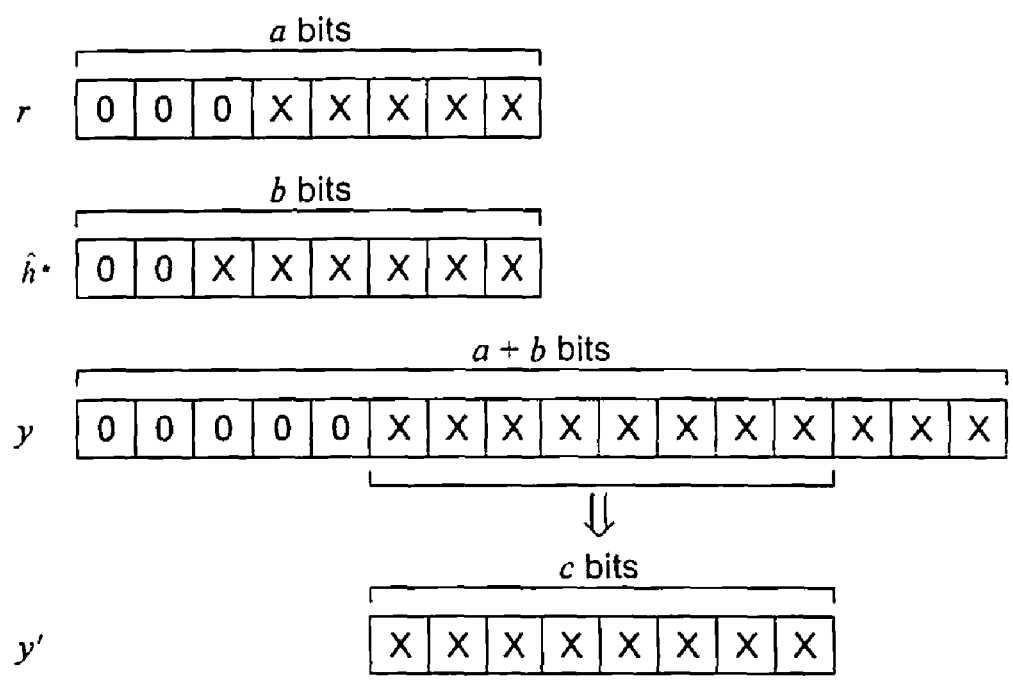
Figure 3D:
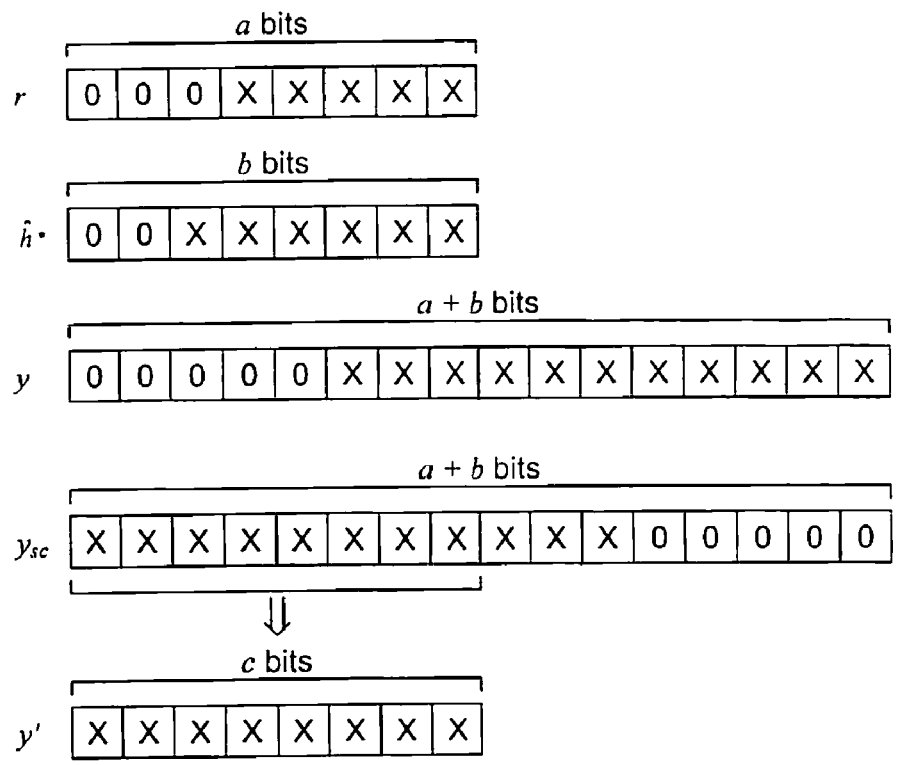
Figure 3E:
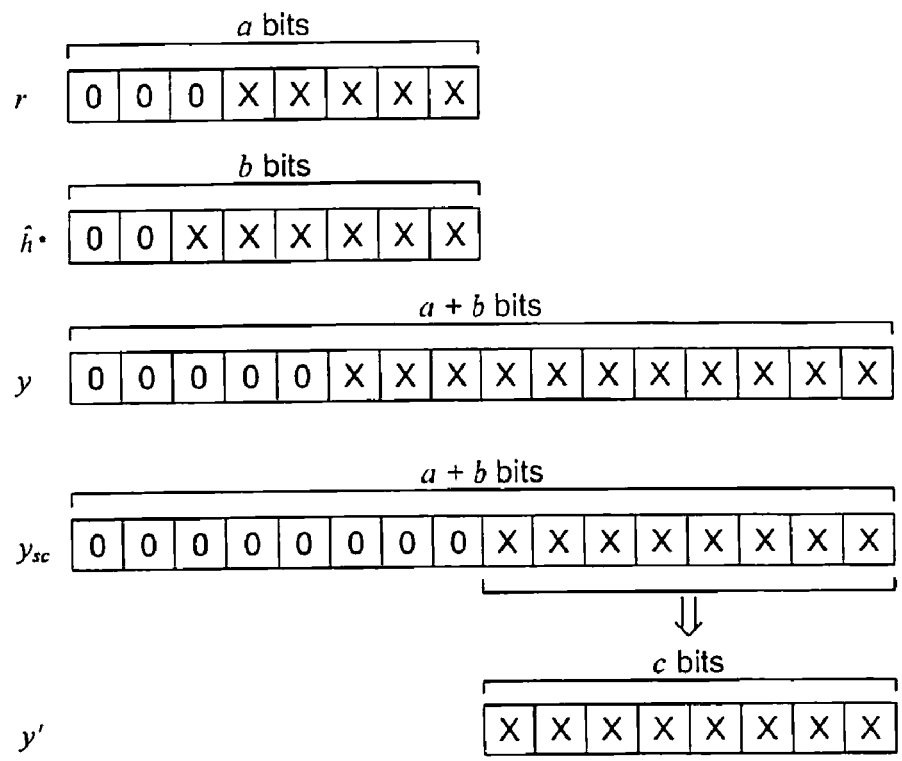

Instead, it would be more expedient to leave out the five "0"-bits and select the following eight bits for y', as it is illustrated in FIG. 3c. The same result is achieved if the value y with the leading zeros is shifted five bits to the left, which corresponds to multiplying y by a scaling factor $2^5$, and y' is then again taken as the eight most significant bits of the scaled value $y_{sc}$. This is illustrated in FIG. 3d. Alternatively, the value y with the leading zeros could also be shifted three bits to the right, which corresponds to multiplying y by a scaling factor $2^{-3}$, and y' could then be taken as the eight least significant bits of the scaled value $y_{sc}$. This is illustrated in FIG. 3e.

Instead of multiplying the values of y by a factor $2^x$, which corresponds to shifting a number of bits to the left or right, the values could also be multiplied by a more general scaling factor to achieve an appropriate value of y'. When y' is represented with c bits (in two's complement notation in both the real and imaginary parts), where c<a+b, the values need, as mentioned above, to be truncated and thus also scaled, which can be done by multiplying y with a scaling factor and then truncating e.g. the decimal part. Some overflow control is used to handle values larger than $2^{c-1}-1$ and values less than $-2^{c-1}$. Hence both the real and imaginary part of y' will be represented by integers between $2^{c-1}-1$ and $-2^{c-1}$.

Figure 5:
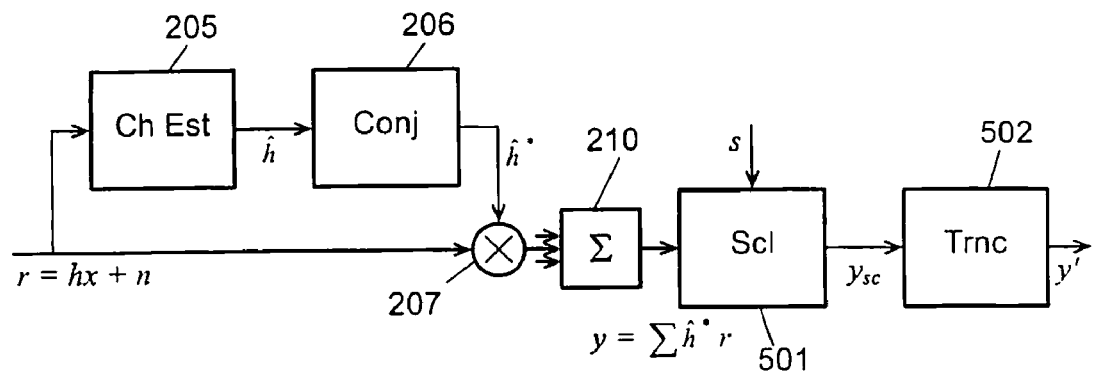
FIG. 5 shows part of the circuit in FIG. 2 with a scaling unit and a truncations unit.

FIG. 5 shows the most relevant part of the circuit of FIG. 2 with a scaling unit 501 and a truncation unit 502 added to the circuit. The left part of the figure is only shown for one finger. A scaling factor s is supplied to the scaling unit 501. The present invention relates to the selection of an appropriate scaling factor to be used in the scaling unit 501.

Figure 6:
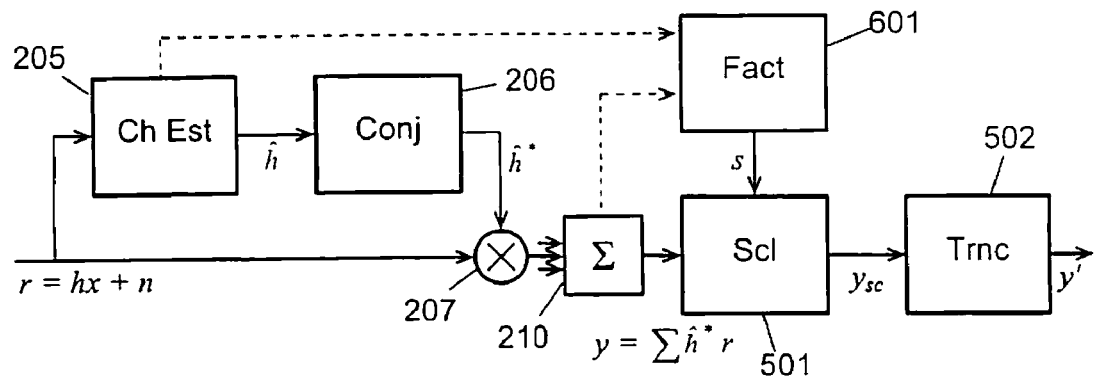
FIG. 6 shows the part of the circuit in FIG. 5, with a scaling factor calculation unit included.

In the present solution a control method is used to compute the scaling factor, which is illustrated in the embodiment shown in FIG. 6, where the scaling factor is calculated in the factor calculation unit 601. The method is based on monitoring a maximum amplitude value of a group of values associated with a time slot $S_n$. The group of values may be the combined symbols themselves, which is illustrated by the dashed line from the summing unit 210, which is part of the combiner 208, to the factor calculation unit 601. The group of values may also be the channel estimates provided by the channel estimator 205. This is illustrated in FIG. 6 by the dashed line from the channel estimator 205 to the factor calculation unit 601.

It is noted that the coded data symbols are transmitted in time slots, so that there is a certain number M of symbols in each time slot. If t denotes the time in time slots, and m is the number of a given symbol in a time slot, $y_{t,m}$ is the estimate of symbol number m in time slot t. In the factor calculation unit 601, the algorithm first calculates an amplitude value $a_{t,m}$ as $$a_{t,m} = \frac{|Re(y_{t,m})| + |Im(y_{t,m})|}{2}.$$

The maximum amplitude value $B(S_n)$ of these values for slot $S_n$ is then found, and then a filtered value $B^{filter}(S_n)$ is calculated from the found maximum value and a filtered value from the previous slot according to:

$$B^{filter}(S_n) = \alpha * B(S_n) + (1-\alpha) * B^{filter}(S_{n-1}),$$

wherein $B^{filter}(S_{n-1})$ is the filtered value calculated for the previous slot and α is a filtering parameter<1.

Now, if $B(S_n) < B^{filter}(S_n)$, then the window for selecting the bits, the position of which can be set temporarily using the scaling factor determined by e.g. a fixed scaling factor algorithm based on the relations of the window positions and $B^{filter}(S_{n-1})$, needs to be downshifted in order to "boost" the bits for the whole slot in order to compensate for an underestimated SIR.

The number of bits for the downshifting of the window may be chosen to be equivalent to the difference between the bitwidths of the filtered or averaged value $B^{filter}(S_n)$ and the largest symbol value in the slot (i.e. the maximum amplitude value) $B(S_n)$. The scaling factor, or the number of bits that the window is shifted, may advantageously be kept lower than a scaling factor threshold value $S_{thres}$ in order not to disturb the intrinsic soft information. It should be noted that the comparison with a filtered value is advantageous since, in ideal conditions, such as a stable channel, perfect synchronization and SIR estimates, the scaling factor should not be changed for each TTI (transmission time interval). Changing the scaling factor for each TTI would mean that distorted data symbol estimates would be fed to the downstream decoders which would worsen their performance.

If, on the other hand, e.g. the SIR is underestimated, a proper change of the scaling factor serves to compensate the under-estimated part and thus recover the magnitude of the data symbols for a TTI.

If $B(S_n) > B^{filter}(S_n)$, the window for the bit selection may be unchanged in case the difference is smaller than a certain threshold $B_{thres}$, e.g. corresponding to a factor of 4. This since even if the SIR is overestimated, the performance of the decoders will not be degraded. It is also possible to add the feature that, if the difference is large, the window is shifted up in order to avoid overflow.

According to another embodiment of the invention, the resealing factor, i.e. the number of bits that the window is shifted for each slot, may also be computed prior to the combining by monitoring the maximal value of the channel estimates weighted by SIR for the available paths and receiver antenna in each time slot. This may then be used to select the bits from the combined symbols directly when they are available.

Since the weighted channel estimates can fluctuate over a wide range, it is desirable to compute them with many more bits than what is delivered to the combiner.

In order to maintain the precision, all the channel estimates in one time slot are scaled up so that the most important bit of the largest channel estimates becomes non-zero. Then the combined symbol estimates will be scaled down accordingly in order to protect the intrinsic soft information. Therefore it is advantageous to use a single scaling factor to describe such down-scaling as well as the scaling to select the proper bits from the combiner to the decoder.

Furthermore, when the algorithm for compensating the underestimating of the SIR etc, as described in this disclosure, is implemented, the rescaling may naturally be included in a similar scaling factor which may be denoted rescaling factor.

Using this embodiment the scaling may be performed in real time, i.e. to the time slot of the estimated data symbols that the rescaling factor is calculated. Further it improves computational efficiency since there are normally far fewer channel estimates than estimated data symbols for a slot.

Figure 4:
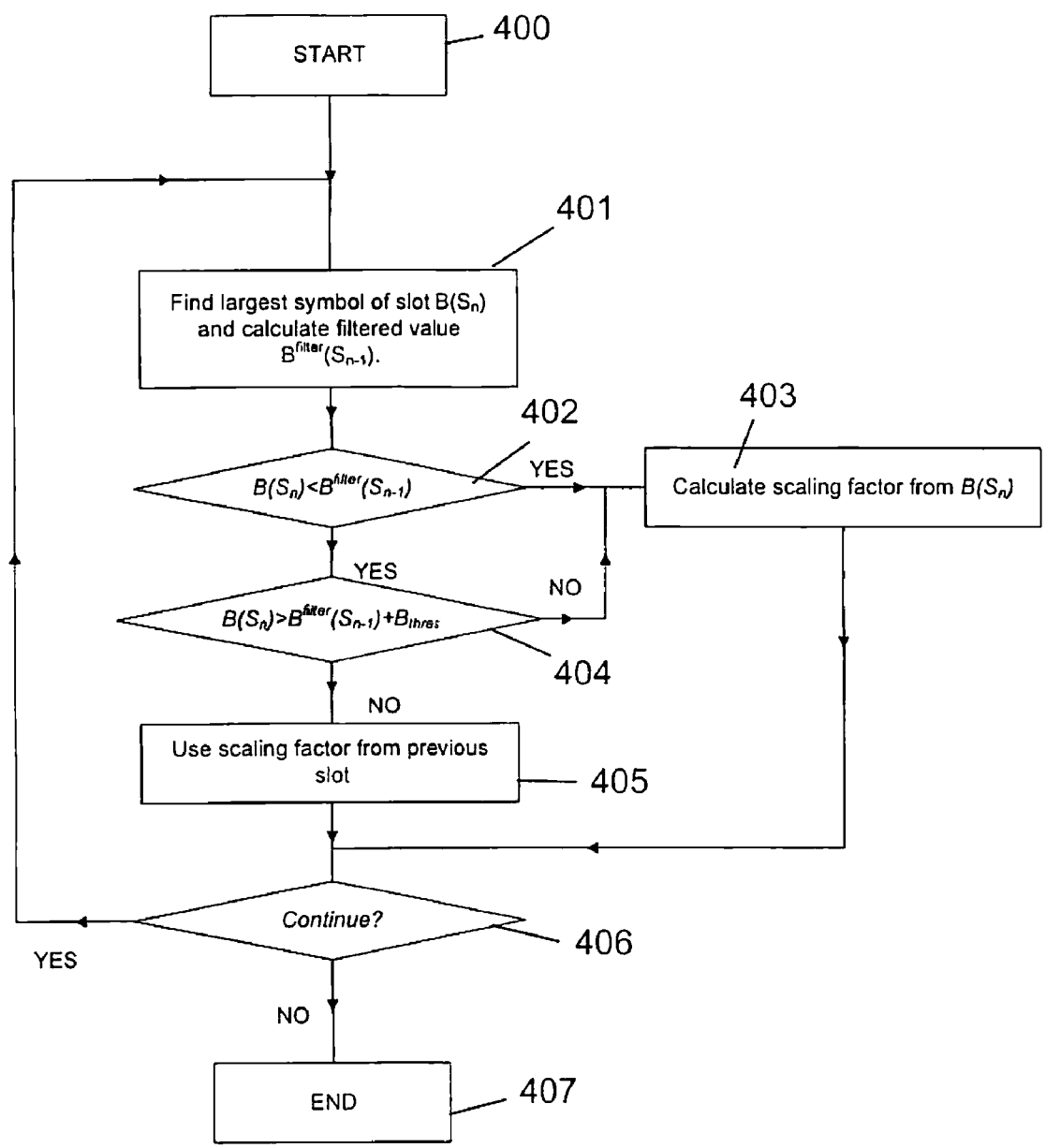
FIG. 4 is a flowchart of an exemplifying embodiment of the invention.

In FIG. 4 an exemplifying embodiment of a process of finding a scaling factor is illustrated. The process of finding scaling factors is started in step 400 in FIG. 4.

In step 401 the maximum value $B(S_n)$ among the amplitude values in a slot $S_n$ is found as is its filtered or averaged value $B^{filter}(S_n)$ according to the expression above. In step 402 it is tested if the maximum value $B(S_n)$ is smaller than the filtered value $B^{filter}(S_n)$. If so, the scaling factor s is calculated based on the maximum value $B(S_n)$. If not, it is tested in step 404 if the maximum value $B(S_n)$ is larger than the filtered value $B^{filter}(S_n)$ by more than a certain threshold $B_{thres}$. If so, the scaling factor s is calculated in step 403 based on the maximum value to shift up the window. If not so, the scaling factor s is set in step 405 to the scaling factor from the previous slot, i.e. it remains unchanged.

In step 406 it is tested if the process should continue, i.e. if there are more bits that need to be processed. If there are more bits, the process is repeated from step 401, and if not the process is ended in step 407.

It may be noted that there are several complicated issues when it comes to finding a good scaling factor, or, in other terms, a good placement of the window. First of all, values that are output from the combiner are most often used by a decoder, in many cases an iterative decoder, such as a Turbo decoder. This decoder commonly works on TTI (transmission time interval) basis (n*15 slots, n=1, 2, 4, 8) not slot basis. Because of this a good placement of a combiner window for a slot as is shown in FIGS. 3a, 3c, 3d and 3e is not is not necessarily beneficial for the decoder. The requirements from the decoder are that the output values are distorted as little as possible, and that the SIR is estimated properly.

Therefore adaptive scaling methods taking into account the decoder requirements may not deliver the data symbol estimates with the highest possible precision for each time slot, but they would still perform clearly better than the scaling methods shown in FIGS. 3a, 3c, 3d or 3e.

Since the bitwidth, i.e. the number of bits that represents a symbol, is very limited for the decoder, and the dynamic range of the radio channel can be very large, it is very difficult to avoid over-flow or under-flow and simultaneously keep the scaling for the whole TTI stable.

In addition, the SIR estimates used by the combiner on the slot basis can fluctuate a lot, due to imperfect receiver blocks or frequency drift between UE (user equipment) and BS (base station) etc. This in turn means that it is very easy to make false estimates of SIR and worsen the decoder performance.

An advantage of embodiments of the present invention is that incorrect SIR and data symbol estimates may be compensated automatically, and simultaneously the scaling factors over a TTI may be kept as stable as possible.

Figure 7:
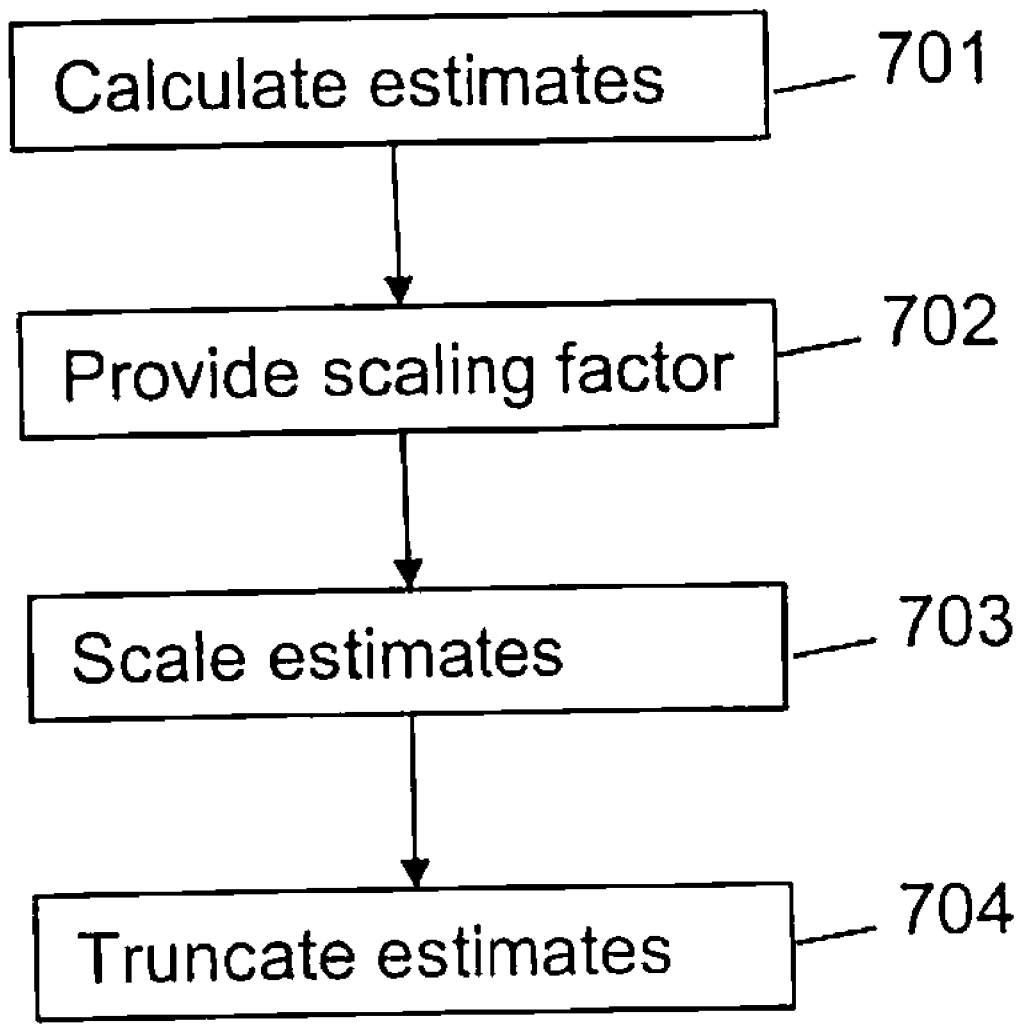
FIG. 7 is a flowchart illustrating a method according to embodiments of the invention.

Finally, in FIG. 7, a schematic flowchart illustrating the method according to embodiments of the invention is shown. Such steps can be implemented in computer code of a computer program executable by a microprocessor. In step 701 first symbol estimates (y) are calculated. A scaling factor is provided in step 702 and in step 703 the scaling factor is used to scale the symbol estimates. In step 704 the scaled symbol estimates are truncated to provide second symbol estimates having a lower bitwidth and which are suitable for use in the downstream processing, e.g. in the decoder.

The receiver circuit comprising embodiments of the invention may be used in a wireless communication device, such as a mobile telephone, pager, etc. or a base station.

The embodiments disclosed herein are merely illustrative and should not be considered restrictive in anyway. The scope of the invention is given by the appended claims, rather than the preceding description, and all variations and equivalents which fall within the range of the claims are intended to be embraced therein.

What is claimed is:

1. A method for receiving coded digital data symbols in a receiver circuit of a receiver, comprising the steps of:
    calculating, by the receiver, first symbol estimates (y) of sent data symbols from the received data symbols, each of the first symbol estimates (y) having a first bitwidth (a+b);
    providing a scaling factor(s) and using the scaling factor (s) to scale the first symbol estimates, further comprising
        finding maximum amplitude value ($B(S_n)$) among a of values associated with a group of received data symbols,
        comparing the maximum amplitude value ($B(S_n)$) with a filtered value ($B^{filter}(S_n)$), wherein
            the filtered value ($B^{filter}(S_n)$) is calculated based on at least a maximum amplitude value ($B(S_{n-1})$) among a group of values associated with a group of previously received data symbols,
        if the maximum amplitude value ($B(S_n)$) is lower than the filtered value $B^{filter}(S_n)$), the scaling factor (s) on basis of the maximum amplitude Value ($B(S_n)$), and
        otherwise providing previous scaling factor ($s_{prev}$) which was provided for a group of first symbols estimates associated with a group of previously received data symbols; and
    truncating the scaled symbol estimates ($y_{sc}$) to a second, lower bitwidth (c) and thereby providing second symbol estimates ($y_t$).

2. The method of claim 1, wherein the receiver is a RAKE receiver adapted to identify and track various multipath signals for a given channel.

3. The method of claim 2, further comprising the steps of:
    assigning to each multipath signal a despreader whose reference copy of the spreading code is delayed equally to the path delay of the corresponding multipath signal; and
    coherently combining the outputs of the despreaders to produce a symbol estimate.

4. The method of claim 1, as implemented in a Code Division Multiple Access (CDMA) receiver.

5. A receiver for receiving coded digital data symbols, comprising:
- means for calculating first symbol estimates (y) of sent data symbols from the received data symbols, each of the first symbol estimates (y) having a first bitwidth (a+b);
- means for providing a scaling factor(s) and using the scaling factor (s) to scale the first symbol estimates, wherein the means for providing the scaling factor(s) further comprises
  - means for finding a maximum amplitude value ($B(S_n)$) among a group of values associated with a group of received data symbols,
  - means for comparing the maximum amplitude value ($B(S_n)$) with a filtered value ($B^{filter}(S_n)$),
  - means for calculating the scaling factor (s) on basis of the maximum amplitude value ($B(S_n)$) if the maximum amplitude value ($B(S_n)$) is lower than the filtered value ($B^{filter}(S_n)$), and
  - means for providing a previous scaling factor ($S_{prev}$) which was provided for a group of first symbols estimates associated with a group of previously received data symbols; and
- means for truncating the scaled symbol estimates ($y_{sc}$) to a second, lower bitwidth (c) and thereby providing second symbol estimates ($y_t$).

6. The receiver of claim 5, wherein the filtered value ($B^{filter}(S_n)$) is calculated based on at least a maximum amplitude value ($B(S_{n-1})$) among a group of values associated with a group of previously received data symbols.

7. The receiver of claim 6, wherein the receiver is a RAKE receiver adapted to identify and track various multipath signals for a given channel.

8. The receiver of claim 7, further comprising:
- a plurality of despreaders;
- means for assigning each multipath signal one of the plurality of despreaders whose reference copy of the spreading code is delayed equally to the path delay of the corresponding multipath signal; and
- means to coherently combine the outputs of the plurality of despreaders to produce a symbol estimate.

9. The receiver of claim 7, as implemented in a Code Division Multiple Access (CDMA) receiver.

* * * * *

UNITED STATES PATENT AND TRADEMARK OFFICE
CERTIFICATE OF CORRECTION

| | |
|---|---|
| PATENT NO. | : 7,916,773 B2 |
| APPLICATION NO. | : 11/858548 |
| DATED | : March 29, 2011 |
| INVENTOR(S) | : Wang et al. |

It is certified that error appears in the above-identified patent and that said Letters Patent is hereby corrected as shown below:

On the Title Page, in Field (56), under "OTHER PUBLICATIONS", in Column 2, Line 4, delete "Ma" and insert -- May --, therefor.

In Column 6, Line 64, delete "resealing" and insert -- rescaling --, therefor.

In Column 7, Line 17, delete "resealing" and insert -- rescaling --, therefor.

In Column 7, Line 18, delete "resealing" and insert -- rescaling --, therefor.

In Column 7, Line 22, delete "resealing" and insert -- rescaling --, therefor.

In Column 8, Line 37, in Claim 1, delete "finding" and insert -- finding a --, therefor.

In Column 8, Line 37, in Claim 1, delete "a of" and insert -- a group of --, therefor.

In Column 8, Line 47, in Claim 1, delete "the scaling" and insert -- calculating the scaling --, therefor.

In Column 8, Line 48, in Claim 1, delete "Value" and insert -- value --, therefor.

In Column 8, Line 49, in Claim 1, delete "otherwise providing" and insert -- otherwise, providing a --, therefor.

In Column 9, Line 19, in Claim 5, delete "($S_{prev}$)" and insert -- ($s_{prev}$) --, therefor.

Signed and Sealed this
Twenty-sixth Day of June, 2012

David J. Kappos
*Director of the United States Patent and Trademark Office*